(12) United States Patent
Wu et al.

(10) Patent No.: US 8,628,385 B2
(45) Date of Patent: Jan. 14, 2014

(54) BONDED ABRASIVE ARTICLE AND METHOD OF USE

(75) Inventors: Jianhui Wu, Westborough, MA (US); Srinivasan Ramanath, Holden, MA (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 1064 days.

(21) Appl. No.: 12/638,689

(22) Filed: Dec. 15, 2009

(65) Prior Publication Data

US 2010/0159806 A1   Jun. 24, 2010

Related U.S. Application Data

(60) Provisional application No. 61/122,595, filed on Dec. 15, 2008.

(51) Int. Cl.
*B23F 21/03* (2006.01)
*B24B 1/00* (2006.01)

(52) U.S. Cl.
USPC .............................. 451/542; 451/546; 451/28

(58) Field of Classification Search
USPC ........................ 451/28, 540–558; 51/308, 309
See application file for complete search history.

(56) References Cited

U.S. PATENT DOCUMENTS

| 4,011,099 | A | 3/1977 | Gutsche |
|---|---|---|---|
| 5,385,591 | A | 1/1995 | Ramanath et al. |
| 5,551,963 | A | 9/1996 | Laramie |
| 5,976,205 | A | 11/1999 | Andrews et al. |
| 6,074,278 | A * | 6/2000 | Wu et al. ........................ 451/28 |
| 6,093,092 | A * | 7/2000 | Ramanath et al. ............ 451/541 |
| 6,102,789 | A | 8/2000 | Ramanath et al. |
| 6,398,827 | B1 | 6/2002 | Ota et al. |
| 6,796,891 | B2 * | 9/2004 | Terada ........................ 451/541 |
| 7,281,970 | B2 * | 10/2007 | Endres et al. ................ 451/548 |
| 2002/0177387 | A1 * | 11/2002 | Keipert et al. ................. 451/28 |
| 2003/0097800 | A1 | 5/2003 | Ramanath et al. |
| 2005/0055885 | A1 | 3/2005 | Obeng |
| 2005/0101237 | A1 * | 5/2005 | Vecchiarelli et al. ......... 451/548 |
| 2006/0199473 | A1 | 9/2006 | Suzuki |
| 2008/0178535 | A1 * | 7/2008 | Wan .............................. 51/297 |

FOREIGN PATENT DOCUMENTS

| CN | 1446667 A | 10/2003 |
| JP | 5285843 A2 | 11/1993 |
| JP | 10166259 A2 | 6/1998 |
| WO | 2006/115581 A2 | 11/2006 |

OTHER PUBLICATIONS

Honglin Zhu, D.E. Niesz, and V.A. Greenhut, The Effect of Abrasive Hardness on the Chemical-Assisted Polishing of (0001) Plane Sapphire, J. Mater. Res. 20(2) (2005) 504-520.

* cited by examiner

*Primary Examiner* — Dung Van Nguyen
(74) *Attorney, Agent, or Firm* — Joseph P. Sullivan; Abel Law Group, LLP

(57) ABSTRACT

An abrasive tool including a bonded abrasive article including a bond material comprising a metal or metal alloy, abrasive grains contained within the bond material, and a reaction agent dispersed within the bond material, wherein the reaction agent chemically reacting with a surface of the workpiece during abrasion to form a reaction product.

20 Claims, 2 Drawing Sheets

BONDED ABRASIVE ARTICLE AND METHOD OF USE

CROSS-REFERENCE TO RELATED APPLICATION(S)

The present application claims priority from U.S. Provisional Patent Application No. 61/122,595, filed Dec. 15, 2008, entitled "Bonded Abrasive Article and Method of Use," naming inventors Jianhui Wu, and Srinivasan Ramanath, which application is incorporated by reference herein in its entirety.

BACKGROUND

1. Field of the Disclosure

The following is directed to abrasive articles, and particularly directed to bonded abrasive articles including a reaction agent within the bond material.

2. Description of the Related Art

Abrasives used in machining applications typically include bonded abrasive articles and coated abrasive articles. Coated abrasive articles generally include a layered article including a backing and an adhesive coat to fix abrasive grains to the backing, the most common example of which is sandpaper. Bonded abrasive tools consist of rigid, and typically monolithic, three-dimensional, abrasive composites in the form of wheels, discs, segments, mounted points, hones and other tool shapes, which can be mounted onto a machining apparatus, such as a grinding or polishing apparatus. Such bonded abrasive tools usually have three phases including abrasive grains, bond material, and porosity, and can be manufactured in a variety of 'grades' and 'structures' that have been defined according to practice in the art by the relative hardness and density of the abrasive composite (grade) and by the volume percentage of abrasive grain, bond, and porosity within the composite (structure).

Bonded abrasive tools are particularly useful in grinding and polishing hard materials, such as single crystal materials typically used in electronics and optics industries. For example, one such material is sapphire, used as windows for infrared and microwave systems, optical transmission windows for ultraviolet to near infrared light, light emitting diodes, ruby lasers, laser diodes, and even as substrates for microelectronic integrated circuit applications, growth of superconducting compounds, and formation of semiconducting materials, such gallium nitride and the like.

Grinding and polishing of single crystal materials, such as sapphire, is an extremely slow and laborious process. Aggressive abrasive processes and materials must be utilized to achieve acceptable polishing rates, and yet such processes put the integrity of the single crystal material at risk for damage and contamination. Accordingly, a need exists in the art for methods and articles for grinding and polishing hard, single crystal materials.

SUMMARY

According to one aspect, a tool includes a bonded abrasive article having a bond material comprising metal or metal alloy, abrasive grains contained within the bond material, and a reaction agent dispersed within the bond material, wherein the reaction agent chemically reacting with a surface of the workpiece during abrasion to form a reaction product.

In a second aspect, a tool includes a bonded abrasive article including a bonded abrasive article having a metal bond material, abrasive grains contained within the metal bond material, and a reaction agent dispersed within the metal bond material, wherein the reaction agent comprises an oxide material for chemically reacting with the surface of the workpiece during abrasion to form a reaction product.

According to another aspect, a tool includes a bonded abrasive article including a metal bond material, wherein the bonded abrasive article comprises a porosity of not less than about 5 vol % of the total volume of the bonded abrasive article, the porosity including open porosity defining a pathway of interconnected channels extending through the body of the bond material. The article further includes abrasive grain contained within the metal bond material, and a reaction agent dispersed within the metal bond material. The reaction agent comprising an oxide particulate material having an average particle size of not greater than about 100 microns and a specific surface area of at least about 50 $m^2/g$, wherein the reaction agent chemically reacts with a surface of a workpiece during abrasion between the bonded abrasive article and the workpiece to form a reaction compound at the surface.

According to another aspect, a method for grinding a workpiece includes providing a workpiece comprising alumina, abrading a surface of the workpiece using a bonded abrasive article made of a bond material comprising metal, abrasive grains contained within the bond material, and a reaction agent dispersed within the bond material. The method further includes chemically reacting the workpiece with the reaction agent to form a reaction compound at the surface of the workpiece during abrading.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following is directed to bonded abrasive tools suitable for grinding hard surfaces. In particular, the bonded abrasive tools herein are particularly suitable for grinding single crystal materials, such as sapphire. The tools are directed to bonded abrasive tools which typically include abrasive grains contained within a three dimensional matrix of bond material which can take many forms.

Figure 1:
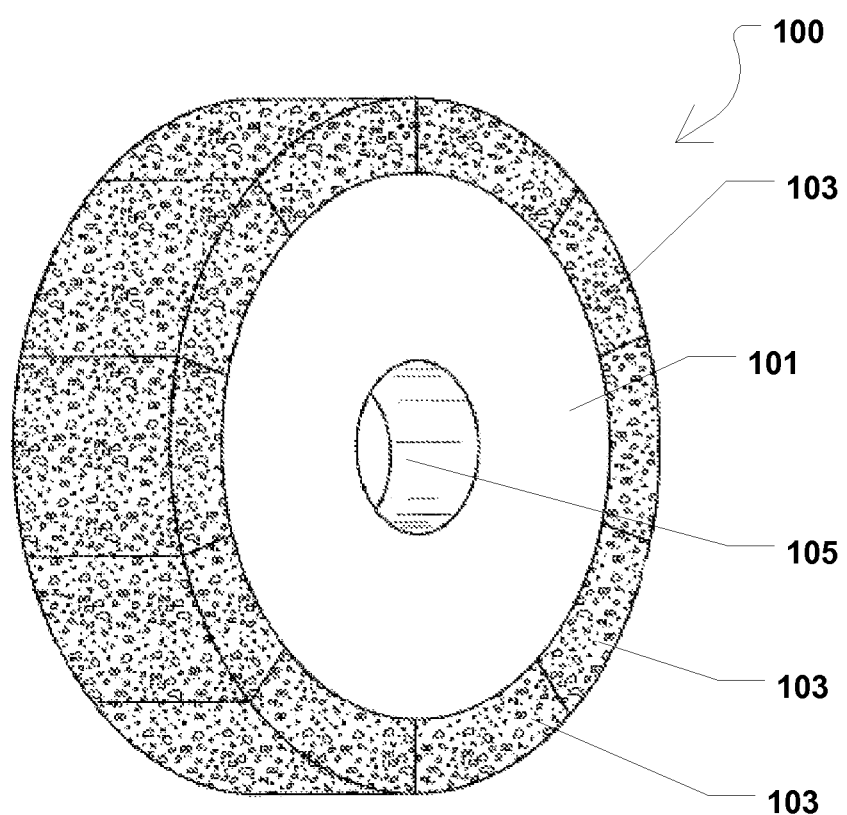
FIG. 1 includes a perspective view of a bonded abrasive tool in accordance with an embodiment.

The bonded abrasive tools generally include a core on which the abrasive article can be bonded. As illustrated in FIG. 1, the abrasive tool 100 can take the shape of the wheel having a cylindrical core 101 upon which the abrasive segments 103 can be bonded. The abrasive tool 100 can be fabricated by first forming individual bonded abrasive segments 103 having predetermined dimensions and attaching the abrasive segments 103 to the circumference of the core 101 with appropriate adhesive. Another fabrication method involves forming a powder mixture of abrasive grains and bond material, molding the composition around the circumference of the core 101, and applying heat and pressure to create and attach the bonded abrasive segments 103 in situ (i.e., co-sintering the core and the rim).

Figure 2:
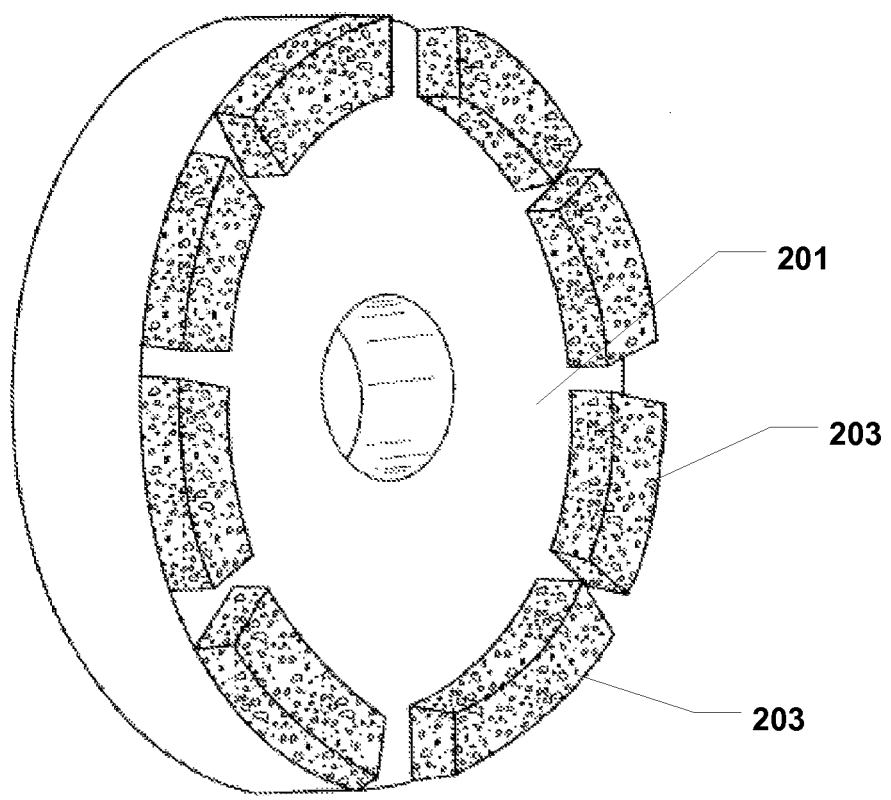
FIG. 2 includes a perspective view of a segmented bonded abrasive tool in accordance with an embodiment.

A continuous abrasive rim made of individual abrasive segments 103 is illustrated in FIG. 1. The core 101 has a central bore 105 for mounting the tool 100 to an arbor or spindle of a grinding machine. The abrasive segments 103 are mounted around the periphery of the core 101, and can include bonded abrasive articles in accordance with embodiments herein. Numerous geometric variations for grinding wheels can be used and can include cup-shaped wheels, as shown in FIG. 2, wherein the abrasive segments 203 are bonded to a major surface of the core 201 as opposed to the circumferential surface. The abrasive tools can have apertures through the core 101 and/or gaps between adjacent abrasive segments 103, and tools with abrasive segments 103 of different widths than the core 101. Apertures or gaps can be used to provide paths to conduct coolant to the grinding zone and to route cutting debris (i.e., swarf) away from the grinding zone.

Generally, the core 101 is a tough material suitable for machining the arbor hole therein for affixing the core 101 to a spindle for grinding operations. The core material can have a density within a range between about 0.5 to about 8.0 g/cm$^3$. Examples of suitable materials for use in the core 101 can include metals, such as steel, aluminum, titanium and bronze, and their composites, alloys, and combinations thereof. Organic material, such as plastics, and particularly reinforced plastics, may be used as the core 101. Composites and reinforced core materials typically have a continuous phase of a metal or a plastic matrix, often in powder form, to which fibers, grains, and/or particles of harder, more resilient, material is added as a discontinuous phase. Examples of reinforcing materials suitable for use in the core 101 include glass fibers, carbon fibers, polymer fibers, ceramic fibers, ceramic particles and grains. Additionally, other materials, such as hollow filler materials can be added to the core 101, which are typically inorganic materials, including for example glass, mullite, and alumina. Such reinforcing materials are utilized for their mechanical characteristics, such that the core has a suitable toughness or stiffness to withstand grinding operations.

The abrasive segments 103 include three-dimensional bonded abrasive articles having a bond material and abrasive grains contained within the bond material for abrading a surface of a workpiece. In accordance with an embodiment, the bonded abrasive articles herein include a metal bond material, such that in certain instances the bond material is made entirely of a metal or metal alloy. For example, suitable metal materials can include copper, tin, iron, zinc, cobalt, aluminum, molybdenum, titanium, silver, indium, antimony, zirconium, vanadium, nickel, chromium, tungsten and combinations or alloys thereof. In accordance with one particular embodiment, the bond material is a bronze material, including copper and tin. Notably, the bond material can incorporate a small percentage of certain other metals that facilitate suitable processing temperatures for formation of the metal bonded abrasive article. For example, such suitable metals include phosphorous, silicon, and boron.

According to one particular embodiment, the bond can be a bronze-based composition including primarily copper and tin. In such instances, the composition can include at least about 35 wt % copper, such as at least about 40 wt %, at least about 50 wt %, at least about 60 wt %, and particularly within a range between about 35 wt % and about 85 wt %. The amount of tin may be less than the amount of copper. For example, the amount of tin can be at least about 15 wt %, such as at least about 25 wt %, at least about 35 wt %, and particularly within a range between about 15 wt % and about 65 wt %.

Generally, the metal bond material is not greater than about 95 vol % of the total volume of the bonded abrasive article. In other instances, the metal bond material may constitute less of the total volume of the bonded abrasive article, such that it is not greater than about 90 vol %, not greater than about 80 vol %, not greater than about 70 vol %, not greater than about 60 vol % or even not greater than about 30 vol %. Particular embodiments herein utilize a volume of metal bond material between about 60 vol % and 95 vol % of the total volume of the bonded abrasive article.

In some instances, as noted above, the bond material can include an organic material such as a resin, like a thermosetting resin. Suitable resins can include epoxy resins or a phenolic resins, which can be used in liquid or powder form. Specific examples of suitable thermosetting resins include phenolic resins (e.g., novolak and resole), epoxy, unsaturated polyester, bismaleimide, polyimide, cyanate ester, melamines, and the like.

The abrasive grains contained within the bond material is of a hardness that is greater than the workpiece, such that the abrasive grains can properly grind and/or polish the surface of the workpiece. For instance, the abrasive grains can have a Mohs hardness of not less than about 5. In one particular embodiment, the abrasive grains includes a material having a Mohs hardness of not less than about 7, such as not less than about 8, such as not less than about 9, or even about 10. Particular embodiments utilize abrasive materials having a Mohs hardness within a range between about 8 and about 10.

Notably, the abrasive grains can include abrasive materials such as alumina, silicon carbide, or a combination thereof. In certain instances, the abrasive grains can include superabrasive materials such as diamond or cubic boron nitride, or a combination thereof. In one particular instance, the abrasive grains are made entirely of diamond (natural or synthetic).

The abrasive grains can have an average particle size suitable for grinding and polishing hard, single crystal materials. In accordance with an embodiment, the abrasive grains have an average particle size not greater than about 100 microns. In other instances, the average particle size can be less, such as not greater than about 75 microns, such as not greater than about 50 microns, not greater than about 25 microns, not greater than about 10 microns, or smaller. Particular embodiments utilize abrasive grains having an average particle size within a range between about 50 nm and about 10 microns.

The abrasive grains are generally present within the bonded abrasive article in minor amounts in comparison to the total volume of the bonded abrasive article. For example, the abrasive grains may comprise not greater than about 30 vol % of the total volume of the bonded abrasive article. Other articles may utilize less abrasive grains, such that they are present in amounts of not greater than about 25 vol %, not greater than about 20 vol % or even not greater than about 10 vol %. Particular embodiments, utilize an amount of abrasive grains, within a range between about 10 vol % and 30 vol % of the total volume of the bonded abrasive article.

The bond wear rate should be equal to or slightly higher than the wear rate of the abrasive grain during grinding operations to facilitate proper grinding performance. As such, a minor amount of wear resistant material having a hardness equal to that of the workpiece material. However, such wear resistant materials are present within the bond in minor amounts, such as not greater than about 10 vol % of the total volume of the bond, and more particularly within a range between about 0.1 vol % and about 5 vol %.

The wear resistant materials are chosen based on their hardness to provide added stiffness to the bond material. Accordingly, the wear resistant filler materials have a Mohs hardness of greater than about 8, and more typically of 9 or greater. According to embodiments herein, wear resistant filler materials include tungsten carbide and alumina, or combinations thereof, since these materials have been shown to form a relatively dense bond structure and are preferred to enable higher material removal rates during grinding.

Other additives may be provided within the bond material to facilitate formation of a suitable bonded abrasive article. Certain metals used in the bond material such as bronze, copper and zinc alloys (brass), cobalt and iron, their alloys and mixtures thereof may be used with titanium or titanium hydride abrasive reactive materials capable of forming a carbide or nitride chemical linkage between the grain and the bond at the surface of the abrasive grain. Use of such materials under certain sintering conditions can strengthen the grain/bond posts and limit premature loss of abrasive grains, workpiece damage, and shortened tool life.

In addition to the abrasive grains and other additives, a reaction agent can be contained within the bond material. The reaction agent chemically reacts with species of the workpiece to form a reaction compound at the interface between the surface of the workpiece and the abrasive tool that the grinding and/or polishing process. In particular, the reaction agent can be uniformly dispersed throughout the bonding material, such that during an abrasion process, a uniform content of the reaction agent is constantly supplied to the surface and chemically reacting with the workpiece.

In accordance with an embodiment, the reaction agent can be an inorganic material, such as a ceramic material. Suitable ceramic materials can include oxides. For example, according to one particular embodiment, the reaction agent is silica. Still, particular embodiments can utilize an oxide material that has a hardness that is different, and particularly less than the abrasive grains.

The reaction agent is generally present within the bond material in a minor amount. For instance, the reaction agent can be present within the bond material in amounts that are not greater than about 10 wt % for the total weight of the bond material. Other embodiments can utilize less of the reaction agent, such that it is present in amounts on the order of not greater than about 8 wt %, not greater than about 5 wt % or even not greater than about 2 wt %. Particular embodiments utilize an amount of the reaction agent within a range between about 1 wt % and 5 wt % of the total weight of the bond material.

The reaction agent can be a particulate material that is dispersed within the bond material having a particularly small average primary particle size that facilitates uniform dispersion of the reaction agent through the bond material during formation of the bonded abrasive article, and suitable continuous presence of the reaction agent at the interface between the bonded abrasive article and workpiece during the abrasion process. The average primary particle size of the reaction agent particulate material is on the order of not greater than about 100 microns, such as not greater than about 75 microns, not greater than about 50 microns, not greater than about 30 microns, or even not greater than about 10 microns. In certain instances, the average primary particle size is within a range between about 0.5 microns and 50 microns and more particularly within a range between about 0.5 microns and about 30 microns. microns.

Generally, the reaction agent particulate material has a high specific surface area to provide increased potential contact surface to facilitate a chemical reaction between the reaction agent material and the workpiece material. As such, in accordance with an embodiment, the reaction agent particulate material has a specific surface area of at least about 50 $m^2/g$. Still, the reaction agent particulate material can have a greater specific surface area, such that it is on the order of at least about 80 $m^2/g$, such as at least about 100 $m^2/g$, or even at least about 150 $m^2/g$. Particular embodiments utilize a reaction agent particulate material having a specific area within a range between about 80 $m^2/g$ and about 200 $m^2/g$.

The reaction agent particulate material may also contain a certain amount of porosity such that it can hold liquids therein, such as water, which can facilitate chemical reactions at the surface of the workpiece. Such porosity within the particles of the reaction agent may be quite small, such that the pores may be nanometer sized (i.e., nanoporosity). Moreover, the porosity can be open or closed porosity. For example, in one particular embodiment, the reaction agent particulate material can be a fumed particulate material, such that it has a certain amount of porosity within the surface of the particles suitable for holding water therein.

Additionally, the reaction agent particulate material can have a certain morphology. For example, in one embodiment, the reaction agent is a substantially spherical particle. In other instances, the reaction agent particulate material can have an elongated or even platelet shaped morphology. As will be appreciated, a combination of morphologies can also be used.

The final-formed bonded abrasive article includes a certain percentage of porosity typically present in the bond material. Such porosity can include open and closed porosity. For example, the bonded abrasive article can have not less than about 5 vol % porosity of the total volume of the bonded abrasive article. In other instances, the bonded abrasive article includes not less than about 10 vol % porosity, such as not less than about 20 vol %, not less than about 25 vol % or even not less than about 30 vol % porosity. In certain embodiments, the bonded abrasive article comprises porosity within a range between about 5 vol % and about 30 vol %.

The bonded abrasive article can include a certain amount of open porosity which is defined by pathways of interconnected channels extending through the body of the bond material that facilitate the flow of liquids through the bonded abrasive article. Flow of liquid through the bonded abrasive body can improve swarf removal and facilitate the formation of the reaction compound, thus improving the grinding and/or polishing process. In fact, the bonded abrasive article can be formed such that a majority of the porosity is open porosity.

In accordance with an alternative embodiment, the abrasive grains can be made of a composite material, such that the grains are particles having a core material and a coating overlying the core material, wherein the core material and coating are made of different materials. In such embodiments, the core material generally includes abrasive grains made of abrasive or superabrasive materials as described herein. The coating may be a layer that substantially surrounds the core material, can be in direct contact with the core material, and can even be chemically bonded to the core material. According to embodiments herein, the coating can form not less than about 3 wt % of the composite particles total weight. In other instances, the coating can be more robust, such that it forms not less than about 5 wt %, not less than about 10 wt %, or even on the order of not less than about 15 wt % or 20 wt % of the total weight of the composite particle. Particular instances utilize a coating that makes up between about 5 wt % and about 20 wt % of the total weight of the composite particle.

The coating can be made of an inorganic material, such as a ceramic, for example, oxides, nitrides, borides, and carbides. According to one embodiment, the coating is an oxide material such as alumina, silica, magnesia, calcia, ceria, or a combination thereof. In one particular instance, the coating material is made entirely of silica. In a more particular embodiment, the coating can include the same material as the reaction agent material. The coating may be made entirely of the reaction agent such that the potential for a chemical reaction at the surface of the workpiece is increased.

The process of forming the bonded abrasive articles described herein includes initially forming a mixture including the metal bond material, abrasive grains, and other additives, for example, the reaction agent. The mixture is generally a dry mixture and includes an amount of bond material within a range between about 60 wt % and about 95 wt %, an amount of abrasive grains within a range between about 5 wt % and about 30 wt %, an amount of pore formers within a range between about 1 wt % and about 5 wt %, and an amount of the reaction agent of not greater than about 10 wt % of the total weight of the mixture.

The pore former can include an organic or inorganic material suitable for forming inclusions and pores within the final-formed abrasive body. In certain instances, organic pore formers can be used, especially in forming processes where high temperature processing will be used such that the organic pore-forming material volatilizes and leaves pores within the bonded abrasive article. According to one embodiment, suitable organic pore formers include materials such as wax, seeds, shells, sulfosuccinates, naphthalenes, polyvinyls, ketones, polystyrenes, polyethylenes, polypropylenes, acrylics, benzene-containing polymers, and a combination thereof.

In other instances, inorganic pore forming materials may be used. Suitable inorganic pore forming materials can include salts such as such chlorides, fluorides, bromides, iodides, silicates, sulfates, carbonates, phosphates, borates, and combinations thereof. For example, according to one embodiment, some particular pore forming materials can include sodium chloride, potassium chloride, magnesium chloride, calcium chloride, sodium silicate, sodium carbonate, sodium sulfate, potassium sulfate, magnesium sulfate. Inorganic salts may be particularly suitable for processing pathways using a leaching process, wherein the inorganic salts are dissolved after forming the bonded abrasive body. The pore formers may also exhibit a relatively high melting point to withstand the sintering process. For example sodium chloride has a melting point of about 800° C. For abrasive articles requiring very high sintering temperatures, pore formers such as sodium aluminum silicate, magnesium sulfate, potassium phosphate, potassium silicate, sodium metasilicate, and a combination thereof may be used.

The particle size of the pore formers can be less than about 500 microns. In other instances, depending upon the nature of the porosity desired, the average particle size of the pore former material can be less, such as not greater than about 300 microns, not greater than about 250 microns, not greater than about 150 microns, not greater than about 100 microns, or particularly within a range between about 1 micron to about 500 microns. For example, certain embodiments utilize pore formers having average particle sizes within a range between about 25 microns and about 200 microns.

After combining and mixing the components, the process of forming the bonded abrasive article can include forming the mixture into the desired shape of the final-formed bonded abrasive article. Suitable forming processes can include hot pressing (at pressures of about 14-28 MPa), cold pressing (at pressures of about 400-500 MPa or more), and hot coining in a steel mold (at pressures of about 90-110 MPa). For organic bond abrasive articles, cold or "warm" pressing operations are more typically, wherein the temperatures are generally less than about 160° C. According to one embodiment, the forming process can include a hot pressing operation, which facilitates sintering of the mixture, allowing densification of the bond material and bonding between all of the components of the mixture. In certain instances, the hot pressing step may be utilized to form the bonded abrasive segments directly to the core, such that the bonded abrasive segments are formed in-situ on the core of the abrasive tool.

Hot pressing can be carried out at temperatures within a range of between about 350° C. and about 500° C. for particular bond compositions, such as those including copper. In particular, the hot pressing temperature can be further modified depending upon the type of pore forming material used. Still, certain embodiments may use a higher hot pressing temperature, such as not less than about 700° C., particularly for bonded abrasive articles using a bond composition including nickel. For example, the hot pressing temperature can be not less than about 750° C., not less than about 800° C., not less than about 850° C., and particularly within a range between about 700° C. to about 1000° C. The bonded abrasive article is hot pressed preferably at pressures below about 4 tons per square inch, such as not greater than about 3.5 tons per square inch, or even not greater than about 3 tons per square inch.

After completing the forming process, certain embodiments utilizing inorganic or organic pore formers may undergo a leaching process to dissolve the pore forming material with a solvent. Leaching can include submerging the formed bonded abrasive article in a bath of a solvent, such as water or ethanol. The bath can be heated to increase the solubility of the pore former material within the solvent, assuring removal of the pore forming materials from the final-formed bonded abrasive article.

After the bonded abrasive article has undergone the leaching process, final-forming processes can be completed to give the bonded abrasive article the proper dimensions and shape. Suitable final-forming processes can include grinding and cutting procedures.

Once the bonded abrasive article has been properly shaped, it can be affixed to a core of an abrasive tool as illustrated in FIGS. 1 and 2. For the processes in which the bonded abrasive segments are not formed in-situ on the core, the bonded abrasive segments can be adhered to the core in the desired arrangement using an adhesive or cement.

The bonded abrasive articles described herein are suitable for grinding hard materials, such as alumina containing materials. For example, the bonded abrasive articles may be particularly suitable for grinding alumina containing materials such as alumina titanium carbide materials typically used in electronics, such as disk drive heads. Additionally, the bonded abrasive articles herein are suitable for grinding hard, single crystal materials, such as sapphire, including a-planes, r-planes, and c-planes of sapphire workpieces.

In particular, the process of grinding a workpiece, such as sapphire, with the bonded abrasive articles of the foregoing can be accomplished by providing the workpiece at a workstation suitable for conducting the grinding operation. Grinding and polishing can be conducted by moving the abrasive tool relative to the workpiece, moving the workpiece relative to the abrasive tool, and even moving both the workpiece and the abrasive tool relative to each other. In such instances of moving both the workpiece and the abrasive tool relative to each other, both objects can be rotated in the same direction or in opposite directions depending upon the amount of material that is intended to be removed.

The grinding and polishing process can include the application of a liquid, such as water to the worksurface, to cool the workpiece and aid removal of swarf. In accordance with the bonded abrasive articles herein, application of water can also facilitate a chemical reaction between the reaction agent and the workpiece to form the reaction compound.

Moreover, the grinding process can incorporate use of other chemical components, such as pH modifiers to facilitate a chemical reaction between the reaction agent and the workpiece. For instance, pH modifiers can be acids and bases. Suitable bases can include hydroxide-containing compounds, such as sodium hydroxide, potassium hydroxide, a combination thereof, and the like. Ammonia may also be used as a pH modifier. Such pH modifiers can provide an alkaline pH work environment at the interface between the workpiece and the bonded abrasive article, such that the pH is at least about 8, at least about 9, or even at least about 10.

In the particular context of grinding sapphire, the basal plane (0001) of sapphire is proven as one of the most difficult surfaces to grind an polish. In accordance with embodiments herein, the grinding of sapphire can utilize a bonded abrasive tool having diamond abrasive grains within a metal bond material and a reaction agent of silica, such that the chemical reaction at the interface between workpiece and the reaction agent is given by the following:

$$2SiO_2 + Al_2O_3 + 2H_2O = Al_2Si_2O_7 \cdot 2H_2O$$

As illustrated by the reaction formula above, provision of the reaction agent silica facilitates the formation of the reaction compound, $Al_2Si_2O_7 \cdot 2H_2O$, which is a hydrated compound. The hydrated compound notably has a hardness that is significantly less than the hardness of the sapphire workpiece. Thus the reaction compound is easy to remove, which increases the material removal rate, increases the lifetime of the bonded abrasive article, and facilitates the formation of a final ground or polished surface of the sapphire having superior surface quality.

EXAMPLE

A sample was formed according to the following process. A mixture was created that included 13 vol % copper, 15 vol % tin, 5% graphite, wherein the graphite had an average particle size of 1-3 microns. The mixture further included 5 vol % silica particles having an average particle size of 5 microns for use as the reaction agent within the final-formed metal bond. Approximately 2 vol % of diamond particles having an average particle size of 3-6 microns were added to the mixture along with 60 vol % salt (NaCl), wherein the salt was sieved using 100-325 U.S. Standard Mesh.

The mixture was hot pressed to form the final-formed metal bond bonded abrasive article. The hot pressing was conducted at a pressure of 31 lbs, at a temperature of 420° C., for a duration of 10 minutes. The final-formed bonded abrasive was then used in a series of grinding tests to measure the performance of the abrasive tool.

The bonded abrasive articles described herein are particularly suitable for grinding hard, single crystal materials. In particular, the bonded abrasive articles herein are suitable for grinding sapphire, which has many uses within the electronics and optics industry and has been noted as a particularly difficult material to grind and polish. While it is noted that certain grinding processes, such as CMP processes using slurries have made use of chemical reagents that facilitate the grinding process, the art has failed to recognize or appreciate incorporation of reaction agents as disclosed herein in bonded abrasive articles. In particular, the foregoing bonded abrasive articles utilize a combination of features not limited to the reaction agent, such as particular abrasive grains, certain bond materials, and porosity. The use of such bonded abrasive articles facilitates greater removal rates during the abrasion process, as well as surface finishes and geographical features of the workpiece that are superior to other methods and articles.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. A tool comprising:
   a bonded abrasive article comprising:
      a bond material comprising a metal or metal alloy;
      abrasive grains contained within the bond material; and
      a reaction agent dispersed within the bond material, the reaction agent chemically reacting with a surface of the workpiece during abrasion to form a reaction product.

2. The article of claim 1, wherein the reaction agent comprises an inorganic material.

3. The article of claim 2, wherein the reaction agent comprises an oxide.

4. The article of claim 3, wherein the reaction agent comprises silica.

5. The article of claim 1, wherein the bond material comprises not greater than about 10 wt % reaction agent for the total weight of the bond material.

6. The article of claim 1, wherein the reaction agent is a particulate material dispersed within the bond material.

7. The article of claim 1, wherein the reaction agent is a particulate material having porosity within the particles.

8. The article of claim 1, wherein the reaction agent is a particulate material having a substantially spherical morphology.

9. The article of claim 1, wherein the abrasive grains include superabrasive materials.

10. The article of claim 1, wherein the abrasive grains comprise composite particles including a core material having a coating, wherein the core material and the coating comprise a different material.

11. The article of claim 10, wherein the core material is a superabrasive material.

12. The article of claim 10, wherein the coating substantially surrounds the core material.

13. The article of claim 10, wherein the coating comprises an oxide.

14. The article of claim 1, wherein the bond material comprises a metal selected from the group of metal consisting of copper, tin, iron, zinc, cobalt, aluminum, molybdenum, titanium, silver, indium, antimony, zirconium, vanadium, nickel, chromium, tungsten and a combination thereof.

15. The article of claim 1, wherein the abrasive grains comprise not greater than about 40 vol % of the total volume of the bonded abrasive article.

16. A tool comprising:
a bonded abrasive article comprising:
a metal bond material;
abrasive grains contained within the metal bond material;
a reaction agent dispersed within the metal bond material, wherein the reaction agent comprises an oxide material for chemically reacting with the surface of the workpiece during abrasion to form a reaction product.

17. The article of claim 16, wherein the bond material comprises an amount of the reaction agent within a range between about 1 wt % and about 5 wt %.

18. The article of claim 16, wherein the reaction agent is a particulate material dispersed within the bond material, the reaction agent particulate material having an average primary particle size of not greater than about 100 microns.

19. The article of claim 16, wherein the reaction agent is a particulate material having porosity within the particles.

20. A method for grinding a workpiece comprising:
providing a workpiece comprising alumina;
abrading a surface of the workpiece using a bonded abrasive article comprising:
a bond material comprising metal;
abrasive grains contained within the bond material; and
a reaction agent dispersed within the bond material; and
chemically reacting the workpiece with the reaction agent to form a reaction compound at the surface of the workpiece during abrading.

* * * * *